Figure 1:
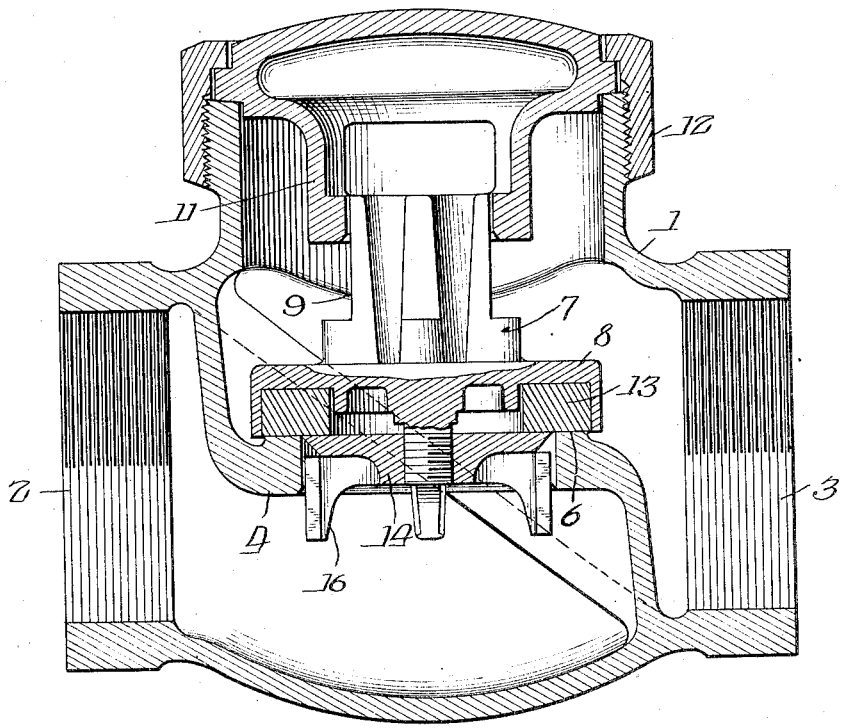

June 6, 1933.     L. H. MOE     1,912,786
REMOVABLE DISK VALVE
Filed June 4, 1931

Inventor
Lawrence H. Moe

Witness

Patented June 6, 1933

1,912,786

UNITED STATES PATENT OFFICE

LAWRENCE H. MOE, OF CHICAGO, ILLINOIS, ASSIGNOR TO CRANE CO., OF CHICAGO, ILLINOIS, A CORPORATION OF ILLINOIS

REMOVABLE DISK VALVE

Application filed June 4, 1931. Serial No. 541,968.

This invention relates to valves and more particularly to pressure operated valves such as check valves capable of forming a tight seal against fluids, such as gasoline.

It is well recognized by those skilled in the art that it is very difficult, if not impossible, to provide a seating surface for a pressure operated valve which is satisfactory in gasoline service, particularly where low pressures are employed. By a pressure operated valve is meant a valve in which the closure member falls by gravity upon its seat and is maintained in closed position by the pressure of the fluid within the valve or within the associated pipes. In other words, the valve closure member is not forced into seating relation by valve stem and associated hand wheel or operating mechanism. Conversely in a positively operated valve the valve seat is forced in position and may be tightly sealed even though there be some irregularities upon either of the contacting surfaces. Such is not the case, however, in a pressure operated valve.

Many attempts have been made to provide satisfactory seating surfaces on valves for this use, such as seating surfaces of rubber compositions, fibrous compositions, and soft metallic alloys. The former surfaces are subject to action thereupon by gasoline, that is rubber and fibrous compounds absorb gasoline and are materially deformed thereby to such an extent that the seating surfaces are totally unfit for service. Rubber composition, for instance, will swell up into a spongy mass which is totally unfit for service as a valve seating surface. If the seating surfaces are hardened to prevent the absorption of gasoline and other fluids identified chemically and physically by similar properties, the surface does not remain tight in use and is not satisfactory for use in pressure operated valves. Metal alloys employed for valve seating purposes have proved unsatisfactory for use in pressure operated valves, particularly in gasoline service, in that they will not maintain a tight seal and any foreign particles readily hold the seating surfaces apart and cause leaks as in the case of hard composition surfaces.

It is the purpose of this invention therefore to provide a valve having a seating surface capable of sealing tightly in a pressure operated valve, which will form a tight seal against gasoline and which will not be detrimentally affected thereby after long continued use.

I have discovered that a pressure operated valve having one of its seating surfaces formed of composition known to the trade as "thiokol", which is understood to be a synthetic composition consisting mainly of combined sulphur and derived from the interaction of additive halogen compounds of olefins and polysulphides and contains olefinic radicals corresponding to olefins having less than four carbon atoms, gives exceptionally good results in gasoline service even when operated at very low pressure heads. The seating surface of "thiokol" forms a perfect seal even after continued use and appears to be impermeable to gasoline and to have an inherent resilient and clinging characteristic which causes it to seal tightly even in cooperation with imperfect cooperative seating surfaces.

Figure 2:
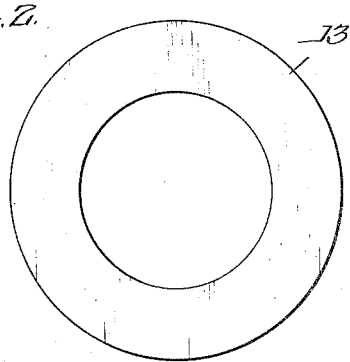

One application of this material in a pressure operated valve is illustrated in the drawing in which:

Fig. 1 is a vertical central section taken through a check valve having a removable seating disk formed of "thiokol", and Fig. 2 is a plan elevation of the disk.

As can be seen from the drawing, the valve comprises a body 1 having an inlet 2 and outlet 3 separated by a partition wall 4 having a port therethrough defined by an annular seat 6. A freely reciprocable closure member 7 terminating in a disk holder 8 upon its lower end is guided for free movements toward and from seat 6 by guide ribs 9 formed upon the stem of the closure member which slidingly fit within the bore of cap 11 secured to the body by nut 12. The holder is provided with an annular seating disk 13 formed of "thiokol", the disk being retained in the holder by a nut 14 threaded to the holder. The latter is provided with guide ribs 16 which assist in guiding the closure member to and from its seat by engagement with the side walls of the port through the partition 4. As can be seen, the disk 13 contacts the annular seat 6 when in closed position and forms a tight seal therewith.

It has been found that when one of the seating surfaces, such as the disk, is formed with "thiokol" the valve will remain tight under extremely low pressures, for example with a pressure head as low as a few pounds. "Thiokol" has the unusual ability of forming a tight seal against a metal seating surface and it also has sufficient inherent resiliency to enable it to conform to its cooperative seating surface even though the latter surface have certain irregularities thereon. Furthermore, "thiokol" does not permanently hold a deformed shape and consequently has the ability to make continued tight seals upon repeated movements and is impervious to gasoline and is not affected by gasoline either chemically or mechanically.

By the use of "thiokol" the grinding of valve seats in an effort to effect a tight seal is eliminated. The material is not distorted by gasoline and consequently stands up well after long continued use in gasoline service, particularly as a seating surface in pressure operated valves.

It will be obvious that the form of this invention shown in the drawing merely illustrates one application thereof and that the "thiokol" seating surface may be formed upon either the stationary or moving seating surface. It is also obvious that it is within the spirit of this invention to make use of both seating surfaces forming a "thiokol" contact. It is furthermore apparent that the shape of the seating surface is immaterial and has nothing to do with its peculiar unexpected sealing ability which enables it to form a tight seal in gasoline service on low pressure heads which constitutes the essence of this invention as defined in the claims. It is only necessary to have the proper proportionate seating surface.

I claim:

1. In a pressure operated valve, a valve body having an inlet and outlet and a partition wall therebetween having a port therethrough, said port being surrounded by a seating surface, a valve closure member within said body, said closure member having a seating surface adapted to cooperate with the seating surface surrounding said port, means for supporting and guiding said closure member for free movements toward and from the seating surface surrounding said port to close and open said port under action of gravity or fluid pressure in said body, one of said seating surfaces being formed of "thiokol" and being impermeable to gasoline and having an inherent clinging and adhering capacity whereby because of said capacity said valve remains tightly sealed when in closed position by the action of gravity or fluid pressure within said body.

2. In a pressure operated valve, a valve body having an inlet and outlet and a partition wall therebetween having a port therethrough, a valve closure member within said body adapted to close said port, said closure member having a seating surface of "thiokol" and being impermeable to gasoline and having an inherent clinging and adhering capacity whereby because of said capacity said closure member remains tightly sealed when in closed position by the action of gravity or fluid pressure within said body, means for supporting and guiding said closure member for free movements toward and from said ported partition under the action of gravity or fluid pressure in said body.

In witness of the foregoing I affix my signature.

LAWRENCE H. MOE.